United States Patent
Dong et al.

(10) Patent No.: US 11,477,697 B2
(45) Date of Patent: Oct. 18, 2022

(54) TECHNIQUES TO ADJUST TRANSMISSION RATE

(71) Applicant: ZTE Corporation, Guangdong (CN)

(72) Inventors: Fei Dong, Guangdong (CN); He Huang, Guangdong (CN); Qian Dai, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/117,809

(22) Filed: Dec. 10, 2020

(65) Prior Publication Data

US 2021/0099916 A1 Apr. 1, 2021

Related U.S. Application Data

(63) Continuation of application No. PCT/CN2018/092257, filed on Jun. 21, 2018.

(51) Int. Cl.
*H04W 28/22* (2009.01)
*H04W 76/15* (2018.01)
(Continued)

(52) U.S. Cl.
CPC .......... *H04W 28/22* (2013.01); *H04L 5/0055* (2013.01); *H04W 76/11* (2018.02); *H04W 76/15* (2018.02); *H04W 80/02* (2013.01)

(58) Field of Classification Search
CPC ..... H04W 28/22; H04W 28/18; H04W 76/11; H04W 76/15; H04W 76/27; H04W 76/16;
(Continued)

(56) References Cited

U.S. PATENT DOCUMENTS

2007/0173239 A1* 7/2007 Scott ................ H04L 29/06027
455/445
2016/0295613 A1 10/2016 Wager et al.
(Continued)

FOREIGN PATENT DOCUMENTS

CN 104662951 5/2015
CN 107426823 A 12/2017
(Continued)

OTHER PUBLICATIONS

International Search Report and Written Opinion, PCT/CN2018/092257 dated Feb. 18, 2019, 6 pages.
(Continued)

*Primary Examiner* — Jeffrey M Rutkowski
*Assistant Examiner* — Sudesh M Patidar
(74) *Attorney, Agent, or Firm* — Perkins Coie LLP

(57) ABSTRACT

Techniques are described to adjust transmission rates. For example, in a dual-connectivity system, a first communication node can be in communication with a first network node and a second network node. The first communication node may receive from a first network node a first message that includes a recommended bit rate for an ongoing communication between the first communication node and a second communication node. In some embodiments, the first communication node can, in response to receiving the first message, send an acknowledgment or a non-acknowledgment indicator to the first network node indicating that the first communication node accepts or rejects the recommended bit rate.

14 Claims, 12 Drawing Sheets

(51) Int. Cl.
*H04W 76/11* (2018.01)
*H04L 5/00* (2006.01)
*H04W 80/02* (2009.01)

(58) Field of Classification Search
CPC ..... H04W 76/20; H04W 76/23; H04W 76/25; H04W 72/1236; H04W 72/1226; H04W 72/12; H04W 80/02; H04W 84/18; H04W 84/20; H04W 92/20; H04W 92/10; H04W 92/18; H04L 5/0055
See application file for complete search history.

(56) References Cited

U.S. PATENT DOCUMENTS

| | | | |
|---|---|---|---|
| 2018/0124647 A1* | 5/2018 | Dai | H04W 72/08 |
| 2019/0037001 A1* | 1/2019 | Fujishiro | H04L 65/10 |
| 2019/0280805 A1* | 9/2019 | Wu | H04W 36/00 |
| 2020/0163102 A1* | 5/2020 | Chandra | H04L 47/824 |
| 2020/0245188 A1* | 7/2020 | Zhang | H04W 72/1242 |
| 2020/0288351 A1* | 9/2020 | Centonza | H04W 28/12 |
| 2020/0305028 A1* | 9/2020 | Chang | H04L 65/10 |
| 2020/0322831 A1* | 10/2020 | Xu | H04W 76/11 |
| 2020/0396651 A1* | 12/2020 | Wang | H04W 36/0044 |
| 2021/0195466 A1* | 6/2021 | Baek | H04W 28/0268 |
| 2021/0329630 A1* | 10/2021 | Futaki | H04W 28/08 |

FOREIGN PATENT DOCUMENTS

| | | |
|---|---|---|
| CN | 107534969 A | 1/2018 |
| CN | 108039934 A | 5/2018 |
| WO | 2017/196248 | 11/2017 |
| WO | 2018/085140 A1 | 5/2018 |

OTHER PUBLICATIONS

Huawei et al. "Delay budget report and MAC CE adaptation for NR for TS 38.300" 3GPP TSG-WG2 Meeting #102 R2-1809242, May 25, 2018, 1 page.

European Extended Search, EP Appl. No. 18923297.8, dated Jun. 4, 2021, 12 pages.

ZTE Corporation "Consideration on the ECN in NR" R2-1708149, 3GPP TSG RAN WG2 Meeting #99 Berlin, Germany, Aug. 21-25, 2017, 8 pages.

Huawei, HiSilicon "Discussion on voice enhancements in NR", 3GPP TSG-RAN WG2, Meeting #102 Busan, Korea, R2-1808187, Revision of R1-1805709, May 12-25, 2018, 4 pages.

Kyocera, "Feedback aspects for RAN-assisted codec rate adaptation", 3 GPP TSG-RAN WG2 #96, R2-168033, Nov. 14-18, 2016, 5 pages.

Office Action for Co-Pending Chinese Patent Application No. 201880094496.X, dated Jul. 22, 2022, 17 pages with unofficial translation.

* cited by examiner

FIG. 5C

| | Oct 1 | Oct 2 |
|---|---|---|
| DRB ID (510) | R | UL/DL |
| Bit Rate (502) | R | Bit Rate (502) |
| | R | R |

FIG. 6A

| | Oct 1 | Oct 2 |
|---|---|---|
| Cell group ID (608) | R | UL/DL |
| LCID (606) | R | ACK/NACK (602) |
| | R | R |

TECHNIQUES TO ADJUST TRANSMISSION RATE

CROSS-REFERENCE TO RELATED APPLICATION(S)

This application is a continuation of International Patent Application No. PCT/CN2018/092257, filed on Jun. 21, 2018, entitled "TECHNIQUES TO ADJUST TRANSMISSION RATE", the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for a bit rate adjustment process with a feedback. For instance, in embodiments involving a dual connectivity scenario, the RAN side can coordinate the bit rate at the UE side. Further, in embodiments involving a single-connection scenario, a feedback mechanism can be added to better run the process of adjusting the bit rate.

In one exemplary aspect, a wireless communication method is disclosed. The method includes performing communication of a first message between a first communication node and a first network node. The first message includes a recommended bit rate for an ongoing communication between the first communication node and a second communication node. The first network node and a second network node are configured to contemporaneously serve the first communication node. In some embodiments, the exemplary method further includes performing communication of a second message between the first communication node and the first network node in response to the first message. The second message includes an acknowledgment indicator indicating that the first communication node accepts the recommended bit rate, or a non-acknowledgment indicator indicating that the first communication node rejects the recommended bit rate.

In some embodiments, the first network node transmits the first message to the first communication node, and the first network node receives the second message from the first communication node. In some embodiments, the first network node transmits the first message after receiving a notification message from the second network node, and wherein the notification message informs the first network node that a current bit rate of the first communication node does not meet a quality of service requirement. In some embodiments, the notification message includes the recommended bit rate, and a logical channel (LCH) identifier or a data radio bearer (DRB) identifier. In some embodiments, in response to receiving the non-acknowledgment indicator, the first network node performs any one of replacing the second network node, deleting a second network node terminated bearer, or coordinating with the second network node to satisfy current bit rate of the first communication node.

In some embodiments, the first communication node receives the first message from the first network, and the first communication node transmits the second message to the first network node. In some embodiments, the first communication node negotiates acceptability of the recommended bit rate with the second communication node prior to transmitting the second message to the first network node.

In some embodiments, the first and second messages further include a set of identifiers from any one of a first set of identifiers that include a logical channel (LCH) identifier and a first network node indicator or a second network node indicator, a second set of identifiers that include the LCH identifier and a cell group identifier, or a third set of identifiers that include a data radio bearer (DRB) identifier. In some embodiments, the first and second messages include Medium Access Control Control Elements (MAC CEs). In some embodiments, the first communication node includes a first user equipment, the second communication node includes a second user equipment or a multimedia terminal, the first network node includes a master radio access network (RAN) node, and the second network node includes a secondary RAN node.

In yet another exemplary aspect, the above-described method is embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIGS. 5A-5C show three examples of a frame structure for a recommended MAC CE generated by a network node.

FIG. 6A-6C show three examples of a frame structure for a response MAC CE generated by a communication node.

DETAILED DESCRIPTION

In the modern society, voice and video telephony have become a common means of communication designed to satisfy the growing and diverse needs of humans for communication. The development of new generation mobile communication system, also known as new radio (NR), bears the vision of the interconnectedness of human beings. Thus, at this stage, the development of NR communication protocols includes development of technologies such as voice and video transmission.

In the NR protocol, 3GPP has introduced a multimedia telephony (MMTEL) communication. MINITEL communications include voice services and video services that are end-to-end services. However, due to the unstable nature of the network environment, the source side communication node, such as a first UE, or the receiving side communication node, such as a second UE, may experience signal degradation due to the network environment. A communication node can include a user equipment (UE), a mobile device, or a multimedia terminal. As a result, the coverage between the source communication node and the receiver communication node cannot meet the transmission rate requirement. The coverage of the network can be guaranteed by the RAN side that may include a communication node coordinating the transmission rate bit rate of the source-side UE or the receiver-side UE to prevent the occurrence of dropped calls and to ensure the rate adaptation of the sending side UE or the receiving side UE.

At this stage, the addition of NR includes both independent networks such as NR standalone, and dual connectivity (DC) networking, such as E-UTRAN New Radio-Dual Connectivity (EN-DC), Multi-Radio Access Technology Dual Connectivity (MR-DC), and New Radio-New Radio (NR-NR) DC. In the existing protocol, only the network mode of NR standalone is defined.

Figures 1A, 1B:
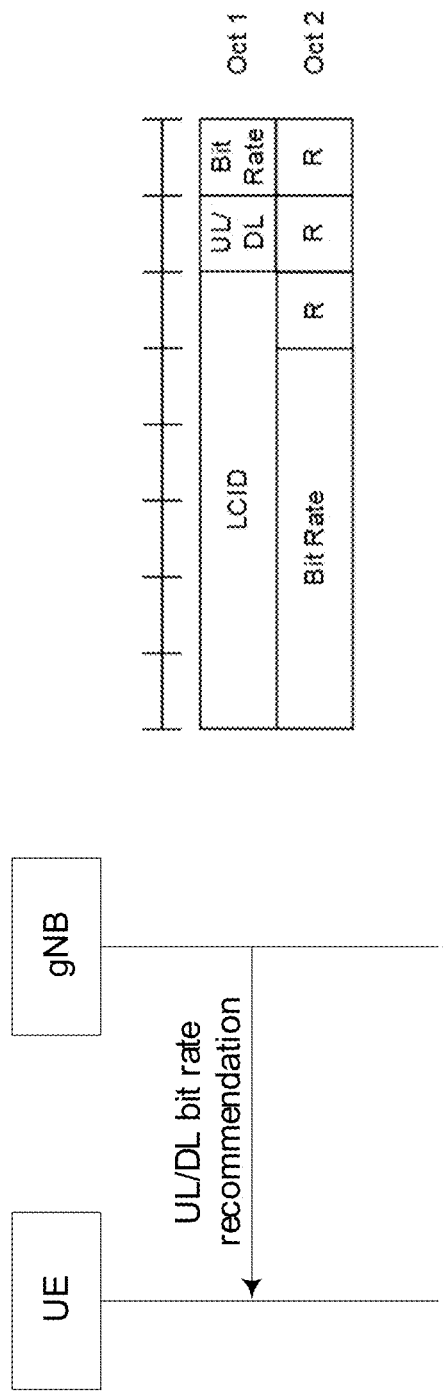
FIGS. 1A and 1B show a flow diagram and a frame structure for sending a bit rate recommendation using a Medium Access Control-Control Element (MAC CE) for existing protocols for the New Radio (NR) standalone scenario.

FIG. 1A shows a flow diagram of the existing protocols for the NR standalone where the RAN side or the gNB adjusts the uplink or downlink codec bit rate of the UE through the defined Medium Access Control Control Element (MAC CE). The RAN side sends to the UE the uplink or downlink bit rate recommendation using the defined MAC CE as shown in FIG. 1B. Based on the recommended bit rate indicated by the MAC CE, the UE can adjust its uplink or downlink bit rate.

Figures 2A, 2B:
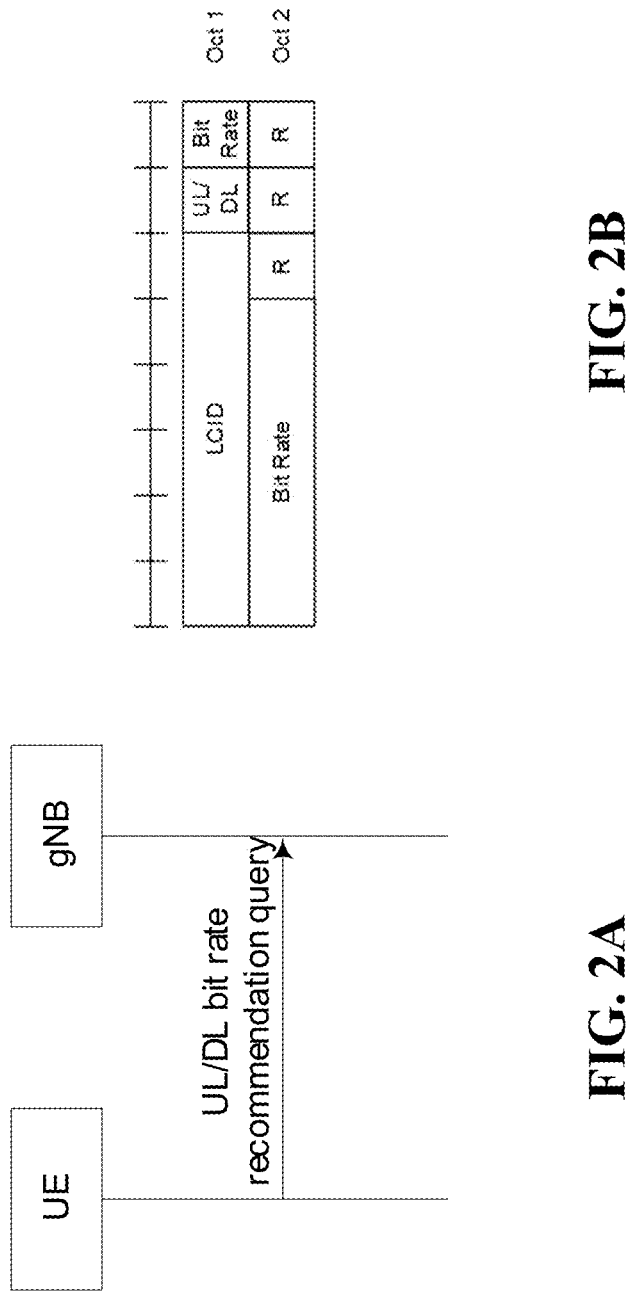
FIGS. 2A and 2B shows a flow diagram and a frame structure for sending a bit rate recommendation using a Medium Access Control-Control Element (MAC CE) for existing protocols for the New Radio (NR) standalone scenario.

FIG. 2A shows another flow diagram of the existing protocol where the UE side can generate and transmit an uplink or downlink bit rate recommendation query to the RAN side. FIG. 2B shows the frame structure used by the UE. Subsequently, the UE in FIG. 2A can adjust its bit rate based on the recommended uplink or downlink bit rate received from the gNB. However, the existing protocol does not include a feedback mechanism between the UE and the gNB when adjusting the bit rate process. In some cases, a UE may receive but may not accept the recommended bit rate indicated by the MAC CE. For example, the UE may determine that decreasing a bit rate may affect the quality of service (QoS) which may be regulated. As a further example, the UE may determine that reducing the bit rate may decrease the quality of the voice or video received from a second communication node. Thus, the effect of adjusting the bit rate may not satisfy the original intention of designing this process. In addition, when the networking mode is dual connectivity, for example in the EN-DC or MR-DC scenario, the existing bit rate adjustment scheme for standalone is no longer adapted to the dual connectivity scenario. The embodiments described in this patent document can overcome at least some of the existing issues with the bit rate adjustment process as described above.

This patent document first provides a summary of the bit rate adjustment techniques for a dual connectivity and single-connection scenario. Next, this patent document describes solutions related to the bit rate adjustment techniques for a dual connectivity scenario. Thereafter, the patent document describes solutions related to the bit rate adjustment techniques for a single connectivity scenario. The example headings for the various sections below are used to facilitate the understanding of the disclosed subject matter and do not limit the scope of the claimed subject matter in any way. Accordingly, one or more features of one example section can be combined with one or more features of another example section.

As mentioned above, in the NR, 3GPP has introduced MMtel communication to provide an end-to-end voice and video services between a first communication node, such as a first UE, and a second communication node, such as a second UE or a multimedia terminal. However, due to the unstable nature of the network environment, the network node, such as a RAN node can adjust the bit rate to ensure network coverage and to prevent dropped calls between the RAN side and a first communication node. One example of an unstable network environment includes a UE that located in a poor network coverage area. Further, a second communication node may also need to adjust its bit rate through the RAN side to ensure that the second communication node is compatible with the rate of the first communication node.

In embodiments involving a dual connectivity scenario, in order to provide a more efficient and flexible way to adjust the bit rate, the disclosed embodiments can use a master node (MN) to adjust the bit rate for the UE's communication with the secondary node (SN). For example, in the scenario of an SN-terminated bearer, when the SN network environment deteriorates, the SN should not arbitrarily decide to lower the bit transmission rate to satisfy the network coverage. In this case, the MN may be notified via a Quality of Service (QoS) notification from the SN. The MN can ensure the network coverage without degrading the bit transmission rate by, for example, changing the SN node or changing the bearer to MN. When the MN determines the MN may not be able to ensure network coverage using the example techniques described in the previous sentence, the MN can inform the UE to adjust the bit rate of the SN directly through a recommended bit rate MAC CE with an SN identifier. Adding an identifier in the MAC CE can enable the MN to initiate an adjustment process for the SN to make the scheduling more flexible.

In embodiments involving a single-connection scenario, the network node such as a gNB may notify a first communication node, such as a UE to adjust the uplink or downlink bit rate of the UE through the recommended bit rate MAC CE. When the first communication node negotiates with a second communication node, such as a second UE or a multimedia terminal communicating with the first communication node through the application layer, the negotiation result is given by the first communication node to the network node, such as a gNB through a response MAC CE. Thus, the first communication node can provide a feedback for better communication services. In embodiments involving a single-connection scenario, the first communication node can request the gNB to adjust the uplink or downlink bit rate of the first communication node through the response MAC CE that includes a new bit rate. The gNB associated with the MN can send a response to the first communication node to indicate whether or not it can satisfy the bit rate adjustment of the request from the first communication node or provide a supported bit rate set to the first communication node. Thus, in such embodiments, the gNB can provide a feedback for better communication services.

The techniques described in this patent document facilitate a bit rate adjustment process with a closed loop feedback that can provide better communication services and can increase the flexibility of the MN to adjust the SN bit rate process across one or more cell groups in the dual connectivity scenario. Thus, the techniques described in this patent document can provide a higher bit rate while providing network coverage.

I. Dual Connectivity Scenario

Figure 3:
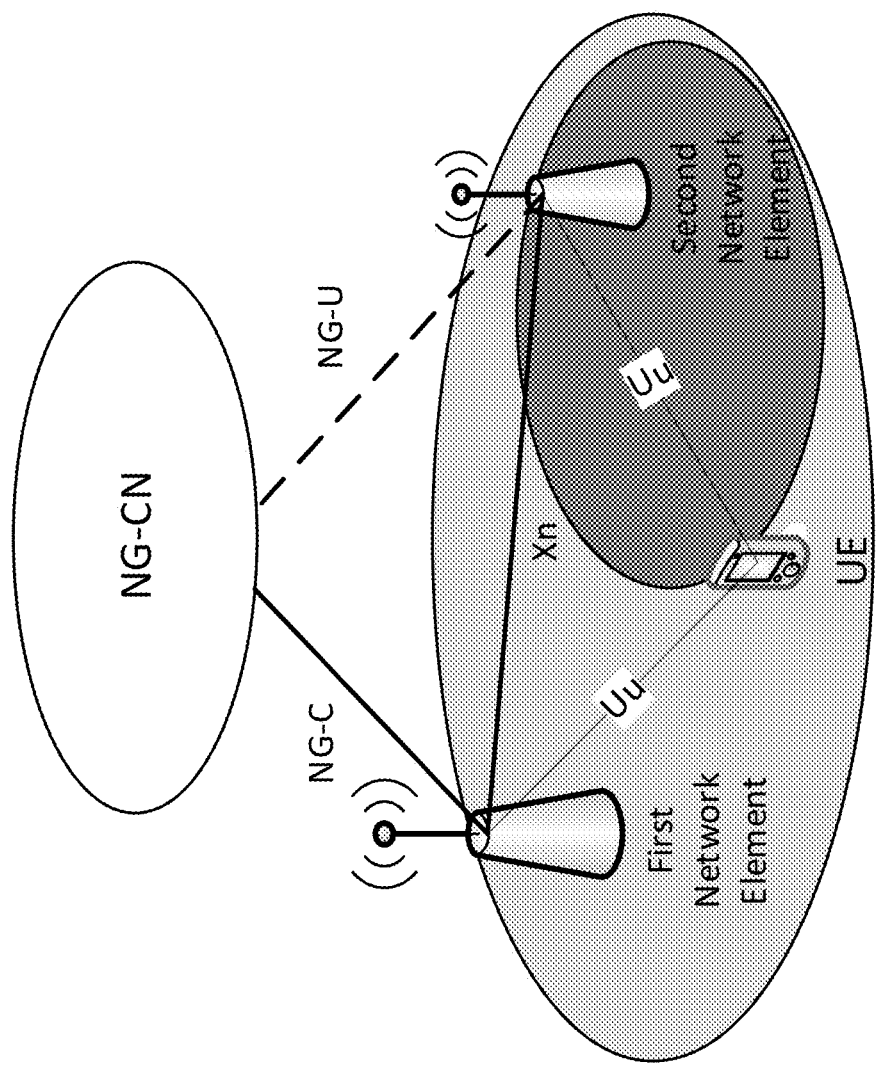
FIG. 3 shows an example of a dual connectivity (DC) system architecture for a NR system.

FIG. 3 shows an example of a dual connectivity (DC) system architecture for a NR system. A DC system may include two (or more) network-side nodes that provide data connectivity to or from UEs. For example, the network nodes may include master and secondary nodes. As another example, the network nodes in a DC system may include an eNB and a gNB or other types of serving network nodes that provide wireless connectivity to UEs. In the DC system, a UE can have multiple transceiver, such as multiple receivers (Rx) or transmitters (Tx). The current serving base station of the UE, such as the first network element shown in FIG. 3, may select a suitable wireless channel for the UE. As an example, the first network element can select a wireless channel with a quality that meets or exceeds a certain threshold. In a DC system, a second base station such as a second network element in FIG. 3 can also communicate with the UE so that the two base stations can jointly provide radio resources for the UE to perform user plane data transmission. The wireless or radio interface between the UE and the first and second network elements are shown as Uu in FIG. 3.

Further, a wired interface is shown in FIG. 3 between the first network element and the next generation core network (NG-CN) so that a first NG control plane NG-C can be established between the first network element and the NG-CN. Another wired interface is shown in FIG. 3 between the second network element and the NG-CN so that a second NG user plane NG-U can be established between the second network element and the NG-CN for the UE. The wired interface, the first network element and the second network element are connected by an ideal or non-ideal inter network element interface called an Xn interface. In terms of a wireless interface, the first network element and the second network element may provide the same or different Radio Access Technology (RAT), and may provide relatively independent scheduling of UEs. The dual connectivity can be implemented by using a master node as the first network element and a secondary node as the second network element. The master and secondary nodes can both be NR RAN nodes, such as gNBs.

I.A. SN Terminated Bearer in DC Mode

Figure 4A:
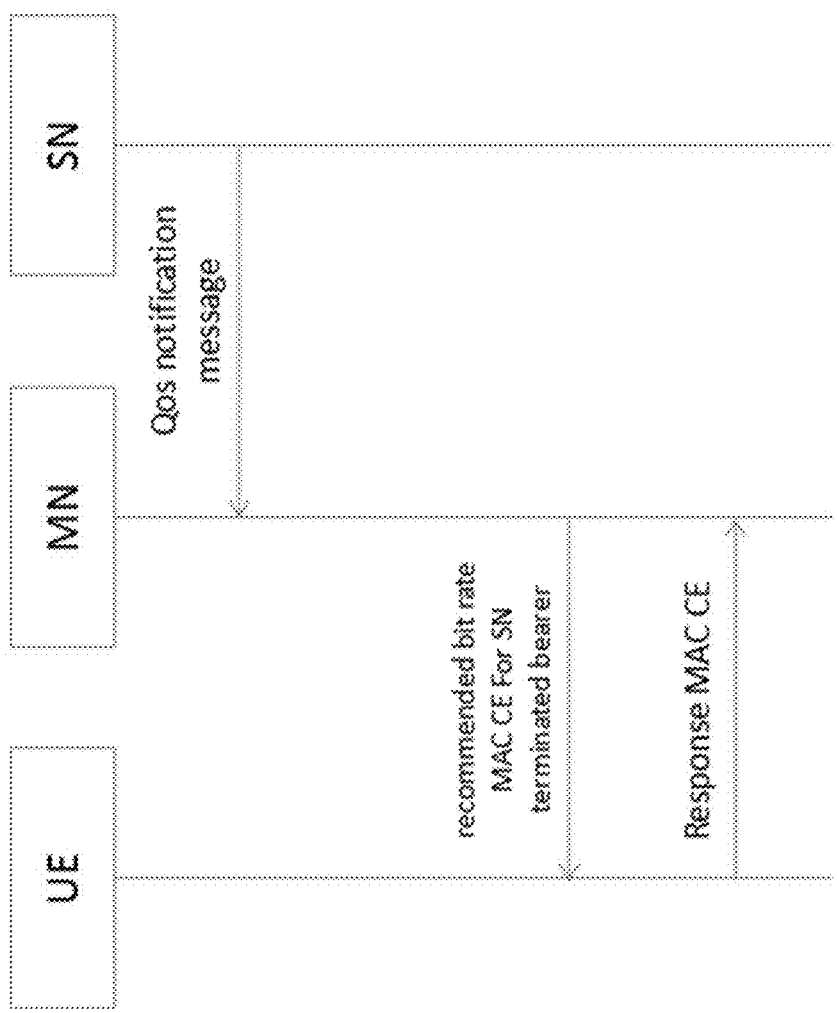
FIG. 4A shows an example of a Radio Access Network (RAN) assisted codec adaptation in the case of SN terminated bearer.

FIG. 4A shows an example of a RAN-assisted codec adaptation in the case of SN terminated bearer. The UE can communicate with the MN and SN in an example dual-connectivity scenario. In one example configuration, the SN is configured to have bearers terminated at the SN. The UE can also communicate with another endpoint communication node (not shown in FIG. 4A) using, for example, the network node(s) such as MN and/or the SN. The other endpoint communication node can include a second UE or a multimedia terminal. At the first step, since the SN carries the DBR of the MMTEL service, when the SN determines that the SN may not be able to meet the current uplink or downlink data transmission rate in the current coverage condition, the SN sends a QoS notification message to the MN to inform the MN that the current bit rate under the current coverage condition cannot meet the QoS requirement. The QoS notification message may include the recommended bit rate, and the LCH identifier (ID) of the bearer service or DRB ID of the bearer service.

If the MN receives the QoS notification message, it may determine to keep the current SN termination bearer unchanged and agree to lower the bit rate to meet the requirement of the SN coverage range. In this example scenario, the MN sends a recommended bit rate MAC CE to inform the UE to reduce the current independent bearer at the SN.

Figure 5A:
Figure 5B:

FIGS. 5A-5C shows three example frame structures of a recommended MAC CE message generated by a network node. The bit rate field (502) in FIGS. 5A to 5C includes the recommended bit rate value. The LCID (506) field in FIGS. 5A and 5B is the logical channel index number. The DRB ID (510) field in FIG. 5C is the data radio bearer index number. The MN/SN indicator (504) field in FIG. 5A is the master node or secondary node identification bits. For the MN/SN indicator field (504), in some embodiments, MN can be set to bit value 0 and SN can be set to bit value of 1. The MN/SN indicator field (504) can have a bit value set to 0 in standalone single-connection scenario.

The cell group ID (508) in FIG. 5B is a cell group index number. In some embodiments, the bit values "00" may represent a master cell group (MCG) ID, and the bit values "01" to approximately "11" may represent the secondary cell group (SCG) ID. the cell group ID (508) can have a bit value set to "00" in a standalone single-connection scenario. The letter "R" in FIGS. 5A-5C are reserved bits and may be set to a bit value of 0.

Returning to FIG. 4A, after receiving the recommended MAC CE, the UE can decode and obtain the logical channel sequence number or data radio bearer sequence number of the bit rate to be adjusted, the specific value of the recommended bit rate, and identifies the cell group ID or MN/SN identifier that carries the service. The UE may use an application layer to negotiate the recommended bit rate with another communication node, such as a second UE through a RAN node (e.g., a gNB). As mentioned above, the UE and the second communication node may have an ongoing communication.

Next, the UE can send a response MAC CE to the MN to notify the MN that the UE received the recommended bit rate MAC CE.

Figure 6B:
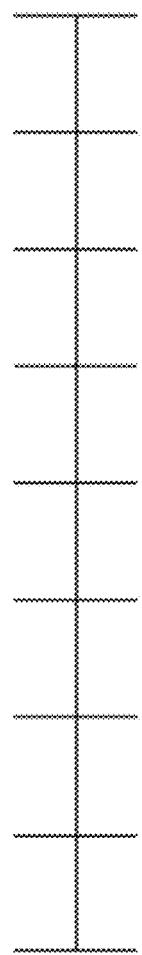
Figure 6C:
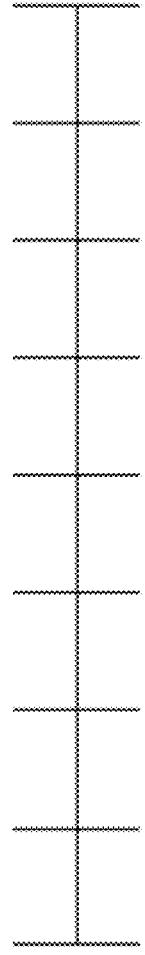

FIGS. 6A-6C shows three example frame structures of a response MAC CE message generated by a communication node. The LCD (606) field in FIGS. 6A and 6B is a logical channel index number. The DRB ID (610) field in FIG. 6C is a data radio bearer index number. The ACK/NACK (602) field is an acknowledgement or non-acknowledgement (NACK) sent by the UE in response to the UE receiving the recommended bit rate information in the recommended MAC CE as further explained below. In some embodiments, ACK can be indicated by a bit value of 1 and NACK can be indicated by a bit value of 0. The MN/SN indicator (604) in FIG. 6B is a master node or secondary node identification bits. For the MN/SN indicator field (604), in some embodiments, MN can be set to bit value 0 and SN can be set to bit value of 1. The MN/SN indicator field (604) can have a bit value set to 0 in standalone single-connection scenario as discussed below.

The cell group ID (608) field in FIG. 6A is a cell group index number. In some embodiments, the bit values "00" may represent a master cell group (MCG) ID, and the bit values "01" to approximately "11" may represent the secondary cell group (SCG) ID. the cell group ID (508) can have a bit value set to "00" in a standalone single-connection scenario. The letter "R" in FIGS. 6A-6C are reserved bits and may be set to a bit value of 0.

Returning to FIG. 4A, in some embodiments where the MN receives from the UE a response MAC CE with the ACK/NACK bit set to 1, the MN may consider that the UE accepts the recommended bit rate carried by the recommended MAC CE.

In some other embodiments where the MN receives from the UE a response MAC CE with the ACK/NACK bit set to 0, the MN may consider that the UE does not accept the recommended bit rate in the recommended MAC CE. When the ACK/NACK bit is set to 0, the MN may determine the next operation. For example, the MN may replace the SN, delete the SN-terminated bearer, or replace the MN with DRB. In some embodiments, the UE can send the ACK/NACK information in a response MAC CE after the UE negotiates the recommended bit rate with the other endpoint communication node.

I.B. RAN-Assisted Codec Adaptation for Split Bearer in DC Mode

Figure 4B:
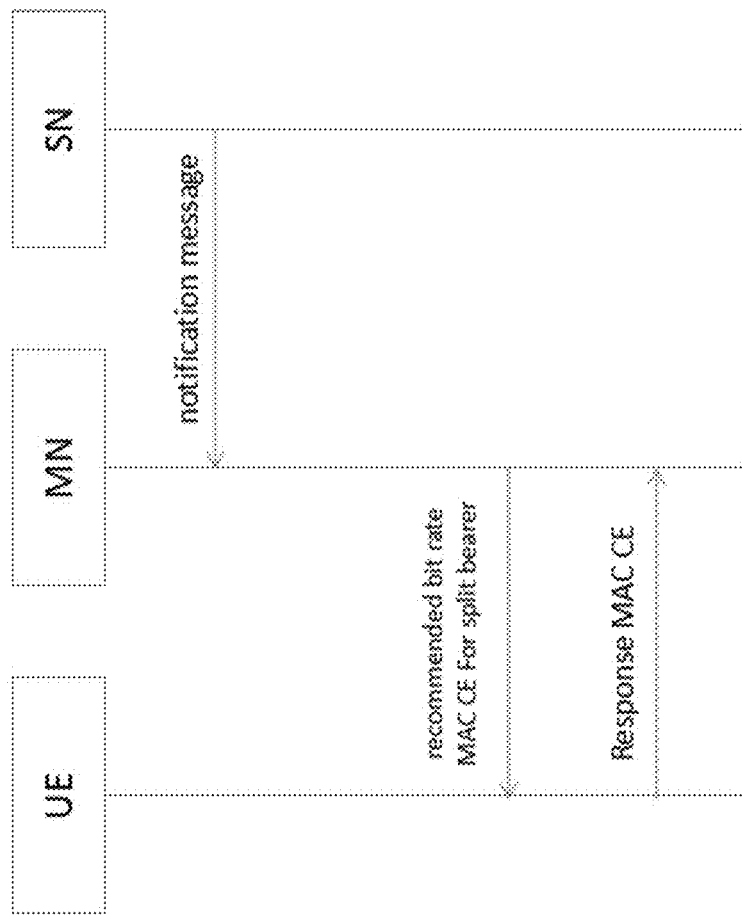
FIG. 4B shows an example of a Radio Access Network (RAN) assisted codec adaptation in the case of split bearer.

FIG. 4B shows an example of a Radio Access Network (RAN) assisted codec adaptation in the case of split bearer. The UE can communicate with the MN and SN in a dual-connectivity scenario. In one example configuration, the MN and the SN are configured to operate in a split bearer configuration. The UE can also communicate with another endpoint communication node (not shown in FIG. 4B) using, for example, the network node(s) such as MN and/or the SN. The other endpoint communication node can include a second UE or a multimedia terminal. At the first step, when the SN determines that the SN may not be able to meet the current uplink or downlink data transmission rate in the current coverage condition, the SN sends a notification message to the MN to inform the MN that the current coverage cannot satisfy the uplink or downlink bit rate. The notification message may include the recommended bit rate, and the LCH ID of the SN bearer data or the DRB ID of the SN bearer data.

When the MN receives the notification message, because it is a split bearer, when the MN determines or agrees to reduce the entire bearer bit rate, including the MN split bearer, to meet the SN coverage requirement, the MN sends a recommended bit rate MAC CE to inform the UE. The recommended bit rate of a certain LCH or a certain DRB currently being carried on the SN may be reduced. The MN may use one of three example frame structures as discussed above for FIGS. 5A-5C to provide the recommended bit rate MAC CE to the UE.

After receiving the recommended MAC CE, the UE may decode and obtain the logical channel sequence number or data radio bearer sequence number of the bit rate to be adjusted, the specific value of the bit rate, and identifies the cell group ID or MN/SN identifier that carries the service. In some embodiments, the UE may negotiate the MN-recommended bit rate with another communication node through the application layer. The UE that receives the recommended bit rate MAC CE can generate and send to the MN a response MAC CE. The UE may use one of three example frame structures as discussed in FIGS. 6A to 6C to provide the response MAC CE.

In some embodiments where the MN receives from the UE a response MAC CE with and the ACK/NACK bit set to 1, the MN may consider that the UE accepts the recommended bit rate carried by the recommended MAC CE.

In some other embodiments where the MN receives from the UE a response MAC CE with the ACK/NACK bit set to 0, the MN may consider that the UE does not accept the recommended bit rate in the recommended MAC CE. When the ACK/NACK bit is set to 0, the MN may determine the next operation. For example, the MN may replace the SN node, delete the SN-terminated bearer, replace the MN with DRB, or the MN and the SN may coordinate with each other to satisfy the current bit rate of the UE.

II. Standalone Scenario

Figure 7:
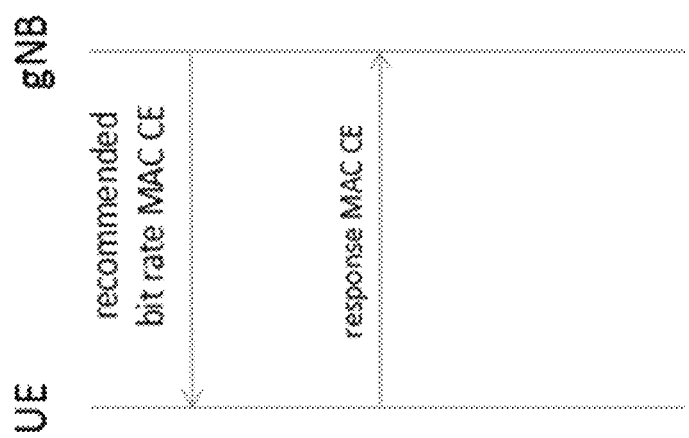
FIG. 7 shows an example of a RAN assisted codec adaptation in the case of a standalone scenario

FIG. 7 shows an example of a RAN-assisted codec adaptation in the case of a standalone scenario. The UE can communicate with the gNB in a standalone scenario. The UE can also communicate with another endpoint communication node (not shown in FIG. 7) using, for example, the gNB. The other endpoint communication node can include a second UE or a multimedia terminal. At the first step, when the gNB detects that the current network environment cannot support the current transmission rate, the gNB can determine to maintain the current network coverage by slowing down the transmission rate by triggering the recommended bit rate process and by sending the recommended bit rate MAC CE to inform the UE. The gNB may use one of three example frame structures as discussed above for FIGS. 5A to 5C to send the recommended MAC CE to the UE.

The UE receives the recommended bit rate MAC CE, and obtains the recommended bit rate after decoding. In some embodiments, the UE may negotiate the gNB-recommended bit rate with another communication node through an upper layer, such as an application layer. The UE can inform the gNB of the negotiation result by generating and sending the response MAC CE. The UE may use one of three example frame structures as discussed above for FIGS. 6A to 6C to send the response MAC CE to the gNB.

In some embodiments where the gNB receives from the UE a response MAC CE with and the ACK/NACK bit set to 1, the gNB may consider that the UE has accepted the recommended bit rate carried by the recommended bit rate MAC CE.

In some other embodiments where the gNB receives from the UE a response MAC CE with the ACK/NACK bit set to 0, the gNB may consider that the UE does not accept the recommended bit rate in the recommended MAC CE. When the ACK/NACK bit is set to 0, the gNB may determine the next operation for adjusting the bit rate.

Figure 8:
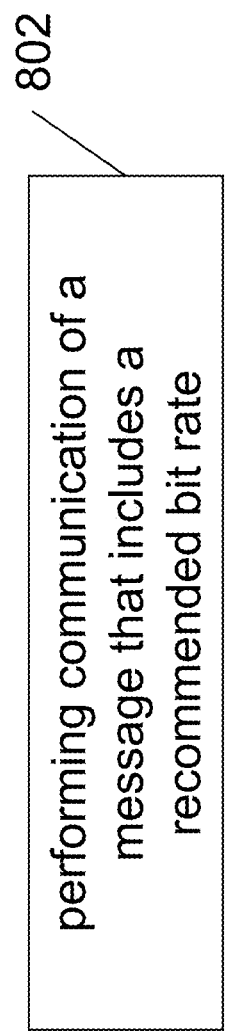
FIG. 8 shows an exemplary flowchart of a wireless communication method.

FIG. 8 shows an exemplary flowchart for a wireless communication method 800. The method 800 includes performing communication of a first message (802) between a first communication node and a first network node. The first message includes a recommended bit rate for an ongoing communication between the first communication node and a second communication node. In some embodiments, the first communication node includes a first user equipment, the second communication node includes a second user equipment or a multimedia terminal, the first network node includes a master radio access network (RAN) node, and the second network node includes a secondary RAN node.

The first network node and a second network node are configured to contemporaneously serve the first communication node, for example, by operating in a dual-connectivity system. A contemporaneous service may include both network nodes being able to make transmissions to the communication node during a given time period that may span multiple time resources or time slots. However, only one of the two network nodes may perform transmissions during a specific time resource or time slot.

In some embodiments, the method 800 may also include performing communication of a second message between the first communication node and the first network node in response to the first message. The second message can include an acknowledgment indicator indicating that the first communication node accepts the recommended bit rate, or a non-acknowledgment indicator indicating that the first communication node rejects the recommended bit rate.

In some embodiments, the first network node transmits the first message to the first communication node, and the first network node receives the second message from the first communication node. In some embodiments, the first network node transmits the first message after receiving a notification message from the second network node. The notification message informs the first network node that a current bit rate of the first communication node does not meet a quality of service requirement. In some embodiments, the notification message includes the recommended bit rate, and a logical channel (LCH) identifier or a data ratio radio bearer (DRB) identifier. In some embodiments, in response to receiving the non-acknowledgment indicator, the first network node performs any one of replacing the second network node, deleting a second network node terminated bearer, or coordinating with the second network node to satisfy current bit rate of the first communication node.

In some other embodiments, the first communication node receives the first message from the first network, and the first communication node transmits the second message to the first network node. In some embodiments, the first communication node negotiates acceptability of the recommended bit rate with the second communication node prior to transmitting the second message to the first network node.

In some embodiments, the first and second messages further include a set of identifiers from any one of a first set of identifiers that include a logical channel (LCH) identifier and a first network node indicator or a second network node indicator, a second set of identifiers that include the LCH identifier and a cell group identifier, or a third set of identifiers that include a data radio bearer (DRB) identifier. In some embodiments, first and second messages include Medium Access Control Control Elements (MAC CEs).

Figure 9:
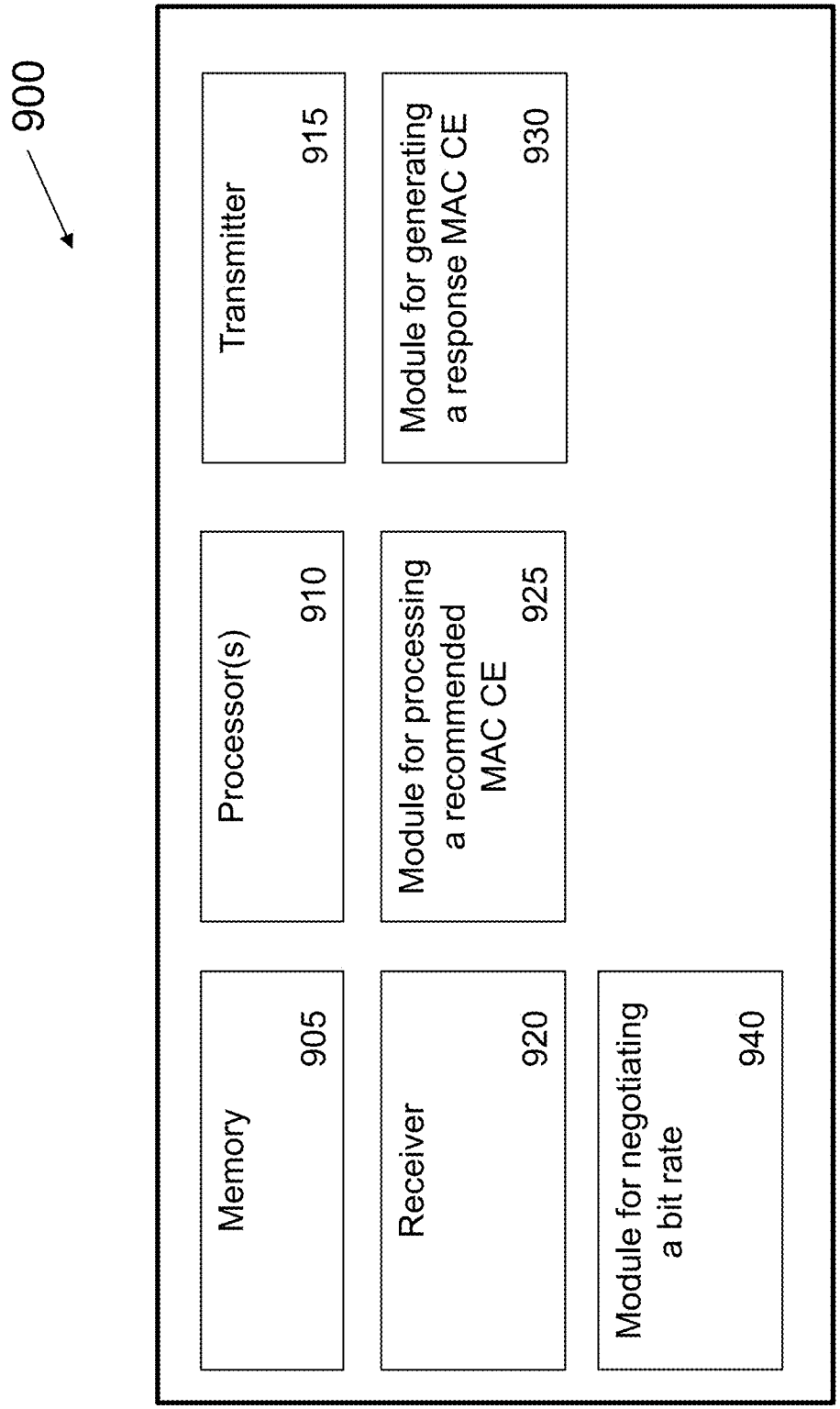
FIG. 9 shows an exemplary block diagram of a communication node.

FIG. 9 shows an exemplary block diagram of a communication node 900. The communication node 900 can include a user equipment, a mobile device, or a multimedia terminal. The communication node 900 includes at least one processor 910 and a memory 905 having instructions stored thereupon. The instructions upon execution by the processor 910 configure the communication node 900 to perform the operations described in FIG. 8 and in the various embodiments described in this patent document. The transmitter 915 transmits or sends information or data to a network node, such as a base station, a RAN node, a gNB, a master RAN node in a dual-connectivity system, or a secondary RAN node in a dual-connectivity system. The receiver 920 receives information or data transmitted or sent by the network node or another communication node.

The module for processing a recommended MAC CE 925 can process the MAC CE with the recommended bit rate, as shown in FIGS. 5A to 5C, sent by a network node. In some embodiments, the module for processing the recommended MAC CE 925 may also process the include additional information as described for FIGS. 5A to 5C.

The module for generating the response MAC CE 930 can generate and send to a network node a response MAC CE as shown in FIGS. 6A to 6C.

The module for negotiating a bit rate 940 can obtain a recommended bit from the module for processing a recommended MAC CE 925. The module for negotiating a bit rate 940 can negotiate using an upper layer the recommended bit rate with another endpoint communication node.

Figure 10:
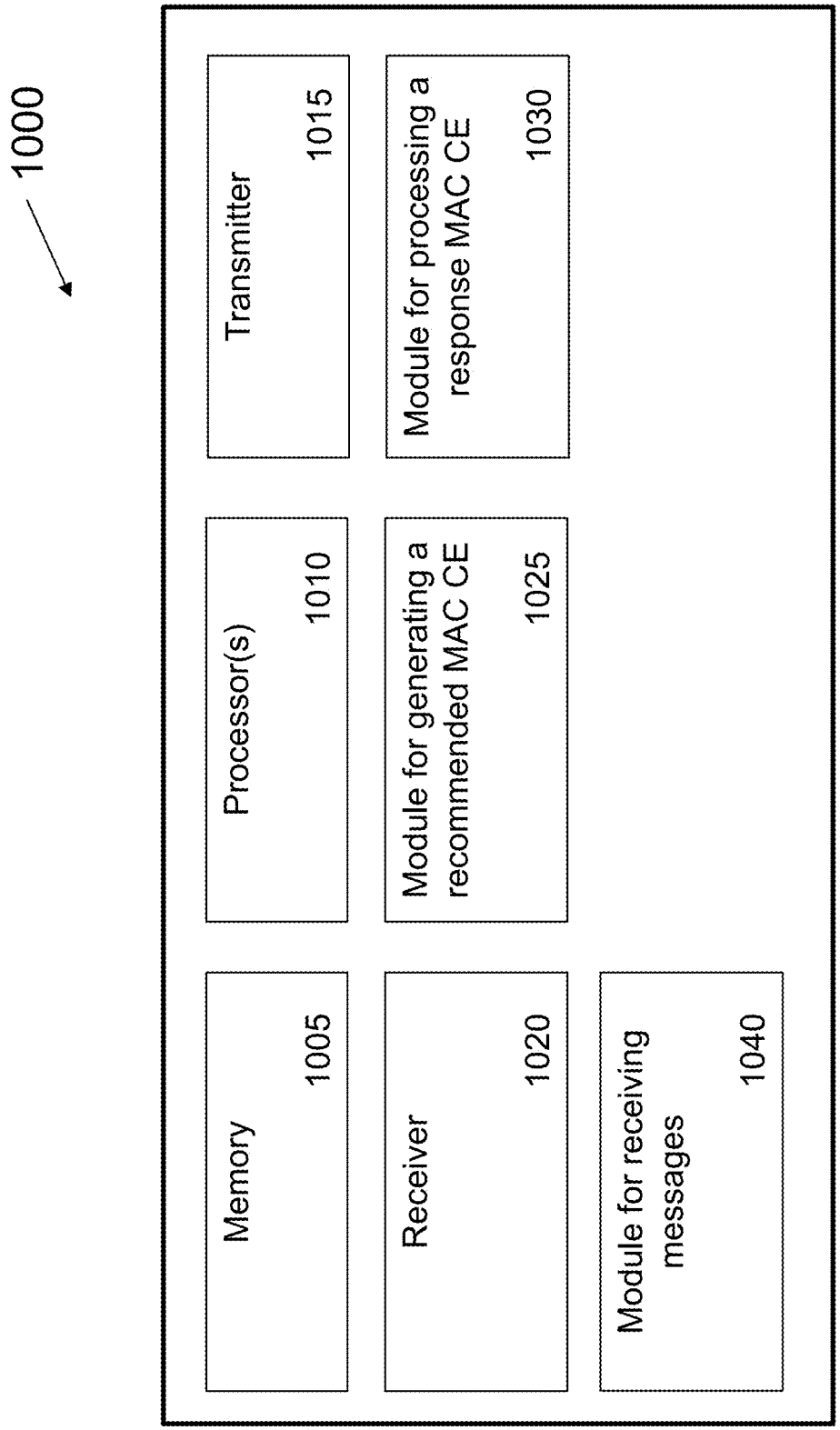
FIG. 10 shows an exemplary block diagram of a network node.

FIG. 10 shows an exemplary block diagram of a network node 1000. The network node 1000 can include a base station, a RAN node, a gNB, a master RAN node in a dual-connectivity system, or a secondary RAN node in a dual-connectivity system. The network node 1000 includes at least one processor 1010 and a memory 1005 having instructions stored thereupon. The instructions upon execution by the processor 1010 configure the network node 1000 to perform the operations described in FIG. 8 and in the various embodiments described in this patent document. The transmitter 1015 transmits or sends information or data to one or more communication nodes or another network node. The receiver 1020 receives information or data transmitted or sent by one or more communication node.

The module for generating the recommended MAC CE 1025 can generate the MAC CE with the recommended bit rate as shown in FIGS. 5A to 5C. In some embodiments, the module for generating the recommended MAC CE 1025 may also include additional information as described for FIG. 5A to 5C.

The module for processing the response MAC CE 1030 can process the MAC CE received from a communication node. The response MAC CE may include information as described for FIGS. 6A to 6C.

The module for receiving notification message 1040 can receive a notification message from another network node.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
    transmitting, by a first network node, a first message to a first communication node, the first message including a recommended bit rate for an ongoing communication between the first communication node and a second communication node,
        wherein the first network node and a second network node are configured to contemporaneously serve the first communication node, and
        wherein the first message is a Medium Access Control Control Element (MAC CE) message that includes the recommended bit rate, a one-bit value that identifies a master radio access network (RAN) node when the one-bit value has a first value and that identifies a secondary RAN node when the one-bit value has a second value, and a logical channel (LCH) identifier; and
    receiving, by the first network node and in response to the first message, a second message from the first communication node, wherein the second message includes:
        an acknowledgment indicator indicating that the first communication node accepts the recommended bit rate, or
        a non-acknowledgment indicator indicating that the first communication node rejects the recommended bit rate,
    wherein the first network node transmits the first message after receiving from the second network node a notification message that informs the first network node that a current bit rate of the first communication node does not meet a quality of service requirement, and that includes the recommended bit rate, and the logical channel (LCH) identifier or a data radio bearer (DRB) identifier, and
    wherein in response to receiving the non-acknowledgment indicator, the first network node performs any one of:
        replacing the second network node,
        deleting a second network node terminated bearer, or
        coordinating with the second network node to satisfy current bit rate of the first communication node.

2. The wireless communication method of claim 1, wherein the second message further include a set of identifiers from any one of:
    a first set of identifiers that include a logical channel (LCH) identifier and a first network node indicator or a second network node indicator,
    a second set of identifiers that include the LCH identifier and a cell group identifier, or
    a third set of identifiers that include a data radio bearer (DRB) identifier.

3. The wireless communication method of claim 1, wherein the second message includes Medium Access Control Control Elements (MAC CEs).

4. The wireless communication method of claim 1, wherein the first communication node includes a first user equipment, the second communication node includes a second user equipment or a multimedia terminal, the first network node includes the master RAN node, and the second network node includes the secondary RAN node.

5. A wireless communication method, comprising:
    receiving, by a first communication node, a first message from a first network node, the first message including a recommended bit rate for an ongoing communication between the first communication node and a second communication node, wherein the first network node and a second network node are configured to contemporaneously serve the first communication node, and
    wherein the first message is a Medium Access Control Control Element (MAC CE) message that includes the recommended bit rate, a one-bit value that identifies a master radio access network (RAN) node when the one-bit value has a first value and that identifies a secondary RAN node when the one-bit value has a second value, and a logical channel (LCH) identifier.

6. The wireless communication method of claim 5, wherein the first message further includes a set of identifiers from any one of:
    a cell group identifier, or
    a data radio bearer (DRB) identifier.

7. The wireless communication method of claim 6, wherein the first communication node includes a first user equipment, the second communication node includes a second user equipment or a multimedia terminal, the first network node includes the master RAN node, and the second network node includes the secondary RAN node.

8. A first network node comprising a processor, configured to implement a method comprising:
  transmit a first message to a first communication node, the first message including a recommended bit rate for an ongoing communication between the first communication node and a second communication node,
    wherein the first network node and a second network node are configured to contemporaneously serve the first communication node, and
    wherein the first message is a Medium Access Control Control Element (MAC CE) message that includes the recommended bit rate, a one-bit value that identifies a master radio access network (RAN) node when the one-bit value has a first value and that identifies a secondary RAN node when the one-bit value has a second value, and a logical channel (LCH) identifier; and
  receive, in response to the first message, a second message from the first communication node, wherein the second message includes:
    an acknowledgment indicator indicating that the first communication node accepts the recommended bit rate, or
    a non-acknowledgment indicator indicating that the first communication node rejects the recommended bit rate,
  wherein the first message is transmitted after a reception from the second network node of a notification message that informs the first network node that a current bit rate of the first communication node does not meet a quality of service requirement, and that includes the recommended bit rate, and the logical channel (LCH) identifier or a data radio bearer (DRB) identifier, and
  wherein in response to the non-acknowledgment indicator being received, the processor is configured to perform any one of:
    replace the second network node,
    delete a second network node terminated bearer, or
    coordinate with the second network node to satisfy current bit rate of the first communication node.

9. The first network node of claim 8, wherein the second message further include a set of identifiers from any one of:
  a first set of identifiers that include a logical channel (LCH) identifier and a first network node indicator or a second network node indicator,
  a second set of identifiers that include the LCH identifier and a cell group identifier, or
  a third set of identifiers that include a data radio bearer (DRB) identifier.

10. The first network node of claim 8, wherein the second message includes Medium Access Control Control Elements (MAC CEs).

11. The first network node of claim 8, wherein the first communication node includes a first user equipment, the second communication node includes a second user equipment or a multimedia terminal, the first network node includes the master RAN node, and the second network node includes the secondary RAN node.

12. A first communication node comprising a processor, configured to implement a method comprising:
  receive a first message from a first network node, the first message including a recommended bit rate for an ongoing communication between the first communication node and a second communication node, wherein the first network node and a second network node are configured to contemporaneously serve the first communication node, and
  wherein the first message is a Medium Access Control Control Element (MAC CE) message that includes the recommended bit rate, a one-bit value that identifies a master radio access network (RAN) node when the one-bit value has a first value and that identifies a secondary RAN node when the one-bit value has a second value, and a logical channel (LCH) identifier.

13. The first communication node of claim 12, wherein the first message further includes a set of identifiers from any one of:
  a cell group identifier, or
  a data radio bearer (DRB) identifier.

14. The first communication node of claim 12, wherein the first communication node includes a first user equipment, the second communication node includes a second user equipment or a multimedia terminal, the first network node includes the master RAN node, and the second network node includes the secondary RAN node.

* * * * *